July 23, 1940.    R. ROSENBERGER    2,209,138
ELECTROMETER
Original Filed Oct. 5, 1937    2 Sheets-Sheet 1

R Rosenberger
inventor

By Glascock Downing & Seebold
Attys.

July 23, 1940. R. ROSENBERGER 2,209,138

ELECTROMETER

Original Filed Oct. 5, 1937     2 Sheets-Sheet 2

R. Rosenberger
INVENTOR

By: Glascock Downing & Seebass
ATTYS.

Patented July 23, 1940

2,209,138

UNITED STATES PATENT OFFICE 2,209,138

ELECTROMETER

Reinhold Rosenberger, Berlin-Friedenau, Germany

Application October 5, 1937, Serial No. 167,469.
Renewed May 3, 1940. In Germany October 9, 1936

8 Claims. (Cl. 175—183)

The present invention relates to electrical measuring apparatus and more particularly pertains to the circuits of such apparatus.

Apparatus adapted to be used for measuring several different electrical constants of substances such as gases, solutions, and solid bodies, and involving the use of thermionic valves are known. Thus, in British Patents Nos. 309,038, 364,939 and 368,998 there is described a type of apparatus suitable for electrochemical measurements, with the aid of which voltages, resistances, and capacities of substances, respectively, can be measured by correspondingly switching over to different circuits. In apparatus of this type, there is provided an oscillation generating circuit causing a high-frequency oscillation, whose amplitude depends on the characteristics of the substances to be interposed in the grid circuit of the valve, which high-frequency oscillation is then employed in the measurement of the resistance or capacity of the substance to be tested. The characteristic values ascertained are preferably indicated on the dial of a measuring or indicator instrument provided in the anode circuit of the valve.

The generation of the oscillations in the known type of apparatus is generally effected by an inductive back coupling between the anode and the grid circuit, either of the two back coupling coils, being shunted by a non-variable or variable condenser, which latter, together with the coil, determines the frequency of the oscillation.

Although apparatus of the aforesaid type have been successfully employed in practice, yet a number of technical disadvantages are still inherent therein: One of the main disadvantages resides in the fact that the current occurring in the indicator instrument varies with the value to be measured in a non-uniform, and of course in a non-linear manner. The effect of the property of the substance to be tested, and represented by the constant to be ascertained by measurement, upon the amplitude of the oscillation, and thus also upon the current occurring in the indicator instrument interposed in the anode circuit, is generally such that even maxima and minima occur when a steadily increasing resistance is interposed in the grid circuit. The current occurring in the indicator instrument may at first increase in accordance with a certain rule and thereafter suddenly fall off. In measuring resistances, the point at which such sudden decrease takes place, in the known type of apparatus, generally occurs when the resistance attains a few hundred ohms. The apparatus thus is useless for making measurements over a broad range without the risk of faulty measurements caused by a reversal of the voltage. Errors of this kind are particularly disturbing when employing such apparatus in chemical laboratories for ascertaining voltages, such as polarization voltages, conductivities, particularly of liquids, and also of di-electrical constants of solid and liquid bodies.

It is an object of the present invention to provide apparatus of the aforesaid kind in which the possibility of such uncontrollable errors of indication is substantially suppressed or even entirely eliminated.

In the annexed drawings

Figures 1 and 2 are diagrammatical representations of curves taken from observations with the aid of the hitherto known type of apparatus, whereas

Figure 1:
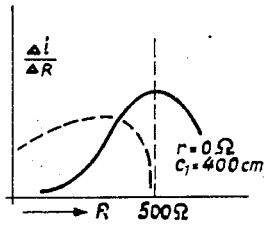

In Figure 1, the current values $i$ relating to apparatus of known type indicated on the dial of the instrument (solid line), and the variation of these current values with the value to be measured are plotted against the resistance values R to be measured. The curves show that a maximum in the current value occurs at about 500 ohms, which makes it clear that the known type of apparatus can only be employed for measuring resistances either exclusively above, or exclusively below, that value.

Figure 2:
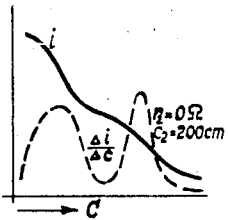

Figure 2 shows a similar curve obtained from the known type of apparatus, when measuring capacities C: Also in that case the $i$-curve, and still more the $$\frac{\Delta i}{\Delta C}\text{-curve}$$

are highly irregular.

Figure 3:
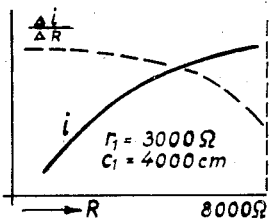
Figures 3, 4 and 5 are similar curves obtained with the apparatus according to the invention.
Figure 4:
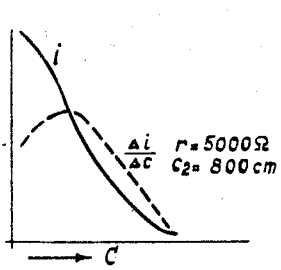

In contradistinction, similar curves represented in Figures 3 and 4 and obtained with the aid of the improved apparatus according to the present invention show that in the measurement of resistances the $i$-curve is extremely uniform, no maximum or minimum occurring up to about 8000 ohms, and that the corresponding $$\frac{\Delta i}{\Delta R}\text{-curve}$$

representing the sensitivity is substantially more uniform than that shown in Figure 1. The same applies to Figure 4, which represents the values for $i$ and $$\frac{\Delta i}{\Delta C}$$

obtained in measuring capacities.

Figure 5:
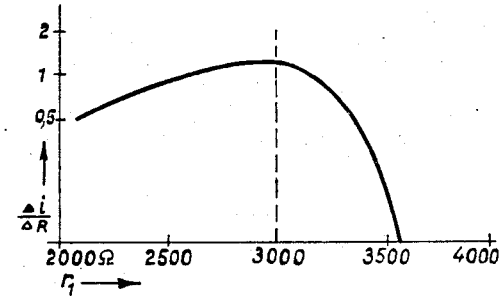

It has been ascertained on the basis of numerous systematic experiments and measurements that the current indicator considered as a function of the constant to be measured, as well as the sensitivity of the measuring instrument are both highly dependent on the attenuation of the oscillating circuit. In the known type of measuring instruments, the attenuation of the oscillating circuit was deliberately kept as low as possible in order to obtain the largest possible amplitude of the oscillations. In carrying out the present invention certain definite damping resistances are interposed in the oscillating circuits either in the form of additional ohmic resistances or in the form of circuit elements having a high attenuating effect. Thus by shunting a resistance of several thousand ohms in parallel with the oscillation circuit coil and the condenser, the sensitivity of the apparatus is considerably increased. Above and below the numerical value of 3000 ohms resistance, the sensitivity of the instrument appreciably decreases as shown in Figure 5, in which the logarithms of $$\frac{\Delta i}{\Delta R}$$

are plotted against the values of the shunted damping resistance, on the basis of an average measuring resistance of between about 1000 to 1500 ohms. The total attenuation of the oscillating circuit, the coils of which are preferably in the form of simple wire coils, when expressed by the attenuation decrement $\vartheta$, amounts to about 3.4 and may vary between about 3.0 and 3.8. An attenuation of approximately the same order can be also obtained by interposing a resistance in series in the oscillating circuit.

It was further observed that when the capacity of the oscillating circuit is increased, the maxima of the $i$-curves shift to substantially higher R-values and are sometimes even completely eliminated. Whilst in the apparatus of the hitherto customary type the oscillating circuit condenser had a capacity or between about 50 and 1000 cms., this capacity in accordance with the present invention is increased to approximately 4000 cms., particularly for the purpose of measuring the conductivity of liquids.

An improved uniformity of the $i$-curve and a fairly uniform and high sensitivity of the measuring instrument is obtainable also in measuring capacities by interposing, a resistance of several thousand ohms in series, with the oscillating circuit coil and the condenser having a capacity of the order of 1000 cms.

Figure 6:
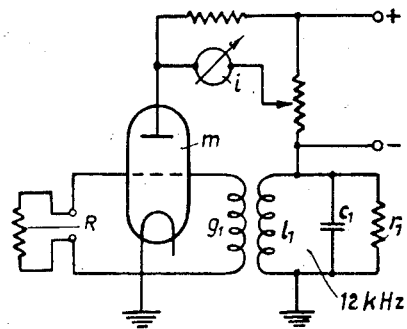
Figures 6, 7 and 8 are diagrammatically representative of the circuiting arrangement in accordance with the present invention, Figure 6 referring to the arrangement to be used for measuring resistances, Figure 7, the same for measuring capacities, and Figure 8, the same for measuring voltages.

Referring to Figure 6, the grid and the cathode of the thermionic valve $m$ are connected with the resistance R to be measured. In the grid circuit there is included a coil $g_1$ inductively coupled with a coil $l_1$ in the anode circuit. In parallel with coil $l_1$ there is provided a non-variable condenser $c_1$ which, together with the coil $l_1$, determines the measuring oscillation, which latter when measuring resistances is of the order of 10 kilocycles, preferably about 12 kilocycles. The anode circuit of the thermionic valve includes the indicator instrument $i$. In the known type of apparatus the condenser $c_1$ disposed in parallel with the fairly undamped coil $l_1$, had a capacity of not more than about 50 to 1000 cms. and the resistance $r_1$ shown in Figure 6 was absent altogether. In carrying the invention into practice the capacity value of the condenser $c_1$ is raised to about 4000 cms., and the resistance $r_1$ of about 3000 ohms is shunted in parallel. This arrangement thus enables the measuring of resistances ranging up to about 8000 and occasionally even to 10,000 ohms while avoiding, within the range of measurement, the occurrence of maxima and/or unsteadiness in the indication.

Figure 7:
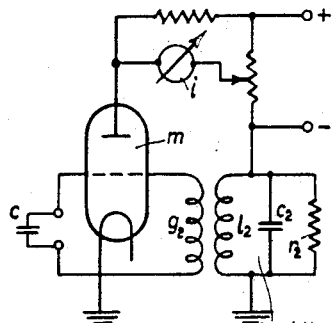

When measuring capacities the grid circuit coil of the thermionic valve is connected with the capacity C to be measured as shown in Fig. 7. The oscillating circuit, the back coupling circuit and the arrangement of the general circuit of the indicator instrument $i$, are substantially the same as in Figure 6, the only difference being that the frequency of oscillation in this case amounts to several hundred kilocycles, preferably about 300 kilocycles, and the condenser $c_2$ has a capacity of the order of 1000 cms., preferably 800 cms. It is further advisable to select a somewhat higher damping resistance $r_2$ for the damping resistance $r_1$ employed in Figure 6, $r_2$ being about 5000 ohms.

Figure 8:
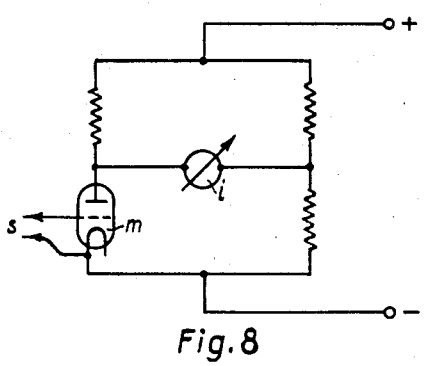

When measuring pure voltages the thermionic valve no longer serves as an oscillation generator, but simply as a thermionic valve voltmeter, preferably in combination with a capacity circuit, in which the instrument $i$ is disposed in the diagonal of a Wheatstone bridge, one member of which is formed by the anode current space of the valve as shown in Fig. 8. The grid space of the valve is connected with the voltage S to be measured.

In all cases a monogrid valve having an anode tension of about 130 volts, an amplification factor of about 3.3% and a mutual A. C.-conductance of about $$2.4 \frac{mA}{V}$$

is preferably employed. But even when employing valves having characteristics different from the aforesaid ones, the advantages in accordance with the present invention are completely obtained.

Figure 9:
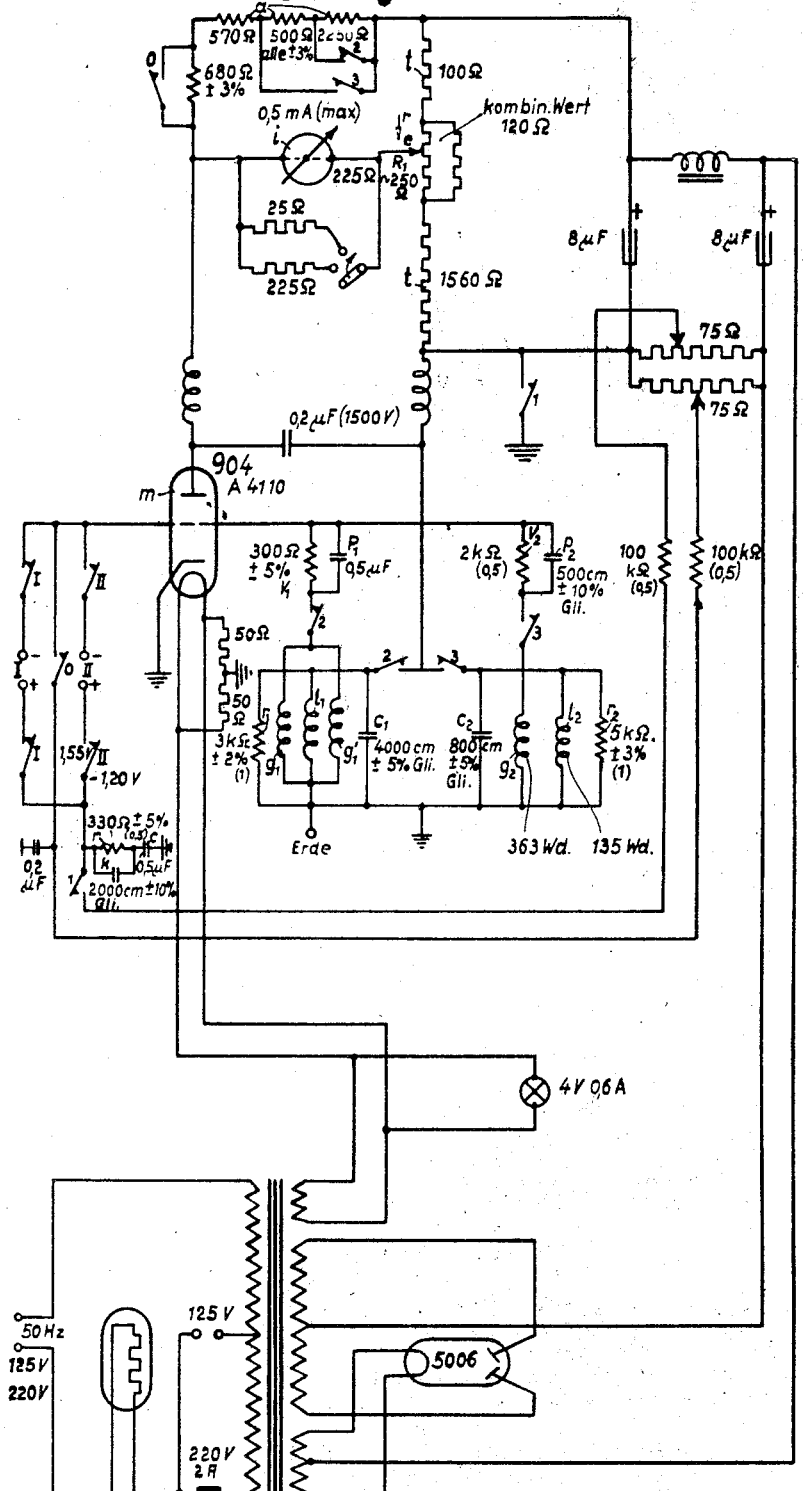
Figure 9 is representative of the manner in which the three types of circuit arangements represented in Figures 6, 7 and 8 may be embodied in a single apparatus.

In Figure 9 the thermionic valve $m$, preferably a monogrid valve of types REN904 or A4110 "Telefunken" is operated from the mains, this being a further advantage over the type of apparatus hitherto employed, in which a battery was provided for this purpose. The anode voltage, after transformation, rectification and smoothing, is tapped from a voltage divider and conducted via resistances $a$, which are partly disconnectible, to the valve anode. The current leading to the indicator instrument $i$ is also tapped from the voltage divider $t$ by means of a tap $e$. The negative pole of the voltage divider $t$ is, in the case of resistance measurements via anode coil $l_1$, and in the case of capacity measurements via anode coil $l_2$, respectively connected with earth, the latter being also connected with the cathode of valve $m$. The anode coil $l_1$ is further inductively coupled with the grid circuit coils $g_1$. The grid circuit coils, and if desired also the anode circuit coil are preferably made double in order to obtain the highest possible coupling factor, and thus also a large oscillation amplitude. It is also possible to increase the coupling factor, when using a simple back-coupling arrangement between only two coils, by disposing in the coils high frequency iron cores. In the case of capacity measurements the grid circuit coil $g_2$, which is inductively back-coupled with the anode coil $l_1$, is in operation.

Each of the grid coils of the two oscillation circuits is connected with the grid of the valve $m$ through a resistance $v_1$ and $v_2$, respectively. The ohmic values of these two resistances are different and the resistor $v_1$ has only a few hundred ohms, such as 300 ohms, so that the negative grid bias caused by the rectified oscillations in the grid circuit is thus relatively low. The resistor $v_2$ is of about 2000 ohms and thus causes a stronger negative grid bias on oscillation. A non-variable condenser $p_1$, connected in parallel with the resistance $v_1$, has a capacity of about 0.5 $\mu$f., while a condenser $p_2$, connected in parallel with resistance $v_2$, has a capacity of about 500 cms., considering that the frequency in this oscillating grid circuit is appreciably higher than in the grid circuit $l_1g_1$.

The substances to be tested are connected at I and II, respectively, with the grid of the valve preferably in such a manner that I is connected with the substance to be tested, while II is connected with a standard substance. It is also possible to dispense with a standard substance using a calibrated table showing the (standard) $i$-curve. Since it has been observed that in spite of the improvements made in accordance with the present invention, the measurement of extremely minute values, particularly when employing very small measurement resistances, still gives rise to the occurrence of maxima or unsteadiness and indefiniteness in the values taken from the indicator instrument, there is further provided a resistance $r$ of approximately three hundred ohms in the lead connecting the substance to be tested to the cathode. By suitably selecting this resistance $r$, which is interposed in the grid circuit and always in series with the substance to be measured, the zero point of the range of measurement is shifted to a point beyond which the measurements are definitely correct. Since numerous tests have shown that the unsteadiness in the indicator current and the maxima of the latter invariably occur below about 300 ohms, it follows that the interposition of resistance $r$ of 330 ohms results in reliably preventing the occurrence of such unsteadiness. Between the resistance $r$ and the cathode, there is further provided a condenser $c$ of about 0.5 $\mu$f. for the purpose of allowing only the alternating current used for measurement to pass through this resistance, while preventing such resistance $r$ from giving rise to a direct voltage having a detrimental influence upon the grid-bias. Finally, resistance $r$ is bridged by a non-variable condenser $k$ of about 2000 cms. so as to enable the oscillations to reach the grid unhampered by the substance to be measured when performing capacity measurements with the aid of oscillating circuit $l_2$.

The different connections required for voltage, resistance and capacity measurements, respectively, are established by means of a series of switches. The switches 1 are to be closed in voltage measurements. The switches 2 are closed for resistance measurements and the switches 3 are closed for capacity measurements. When measuring voltages the two oscillating circuits $l_1c_2$ and $l_2c_2$, are completely disconnected, the circuits in operation thus corresponding to the arrangement shown in Figure 8. In this case, the anode circuit resistances $r$ in Figure 9 and also the tap $e$ on the voltage divider $t$ are adjusted so that the necessary bridge equilibrium is established. When measuring resistances, the oscillation generator circuit including the coil $l_1$, the condenser $c_1$ and the resistor $r_1$ is put into operation together with the back-coupling coils $g_1$ and the series resistance $v_1$, while oscillating circuit formed of the coil $l_2$ and the condenser $c_2$ together with its series resistance $v_2$ are disconnected. The reverse directions apply for capacity measurements.

Preferably, the coils employed in the two oscillating circuits are simple wire cylinder coils, the diameter of the wire being between about 0.1 to 0.4 mm., and the number of turns amounting to several hundreds.

The indicator instrument $i$ is provided with one or more additional shunts in known manner.

What I claim is:

1. In apparatus for measuring electrical resistances and capacities, a thermionic valve including a cathode and an anode and a grid-electrode, a grid circuit and an anode circuit comprising means for generating high-frequency-oscillations consisting of two oscillation circuits each containing an inductance coil and a capacity element, back coupling means between the anode and the grid circuit, a switch adapted to connect said valve to one of said oscillation circuits for the measuring of resistance and to the other circuit for the measuring of capacity, means for connecting the electrical constant to be measured between said cathode and said grid, an indicating instrument in the anode circuit, and each of the high-frequency-oscillation circuits including a damping resistance of at least one thousand ohms disposed in parallel to the inductance coil and the capacity element of said circuit.

2. In apparatus for measuring electrical resistances and capacities, a thermionic valve including a cathode and an anode and a grid-electrode, a grid circuit and an anode circuit comprising means for generating high-frequency-oscillations consisting of two oscillation circuits each containing an inductance coil and a capacity element, back coupling means between the anode and the grid circuit, a switch adapted to connect said valve to one of said oscillation circuits for the measuring of resistance and to the other circuit for the measuring of capacity, means for connecting the electrical constant to be measured between said cathode and said grid, an indicating instrument in the anode circuit, each of the high-frequency-oscillation circuits including a damping resistance of at least one thousand ohms disposed in parallel to the inductance coil and the capacity element of said circuit, and the total attenuation of said oscillation circuit having a logarithmic decrement of between 3.0 and about 3.8.

3. In apparatus for measuring electrical resistances and capacities, a thermionic valve including a cathode and an anode and a grid-electrode, a grid circuit and an anode circuit comprising means for generating high-frequency-oscillations consisting of two oscillation circuits each containing an inductance element, a capacity element, back coupling means between the anode and the grid circuit, a switch adapted to connect said valve to one of said oscillation circuits for the measuring of resistance and to the other circuit for the measuring of capacity, means for connecting the electrical constant to be measured between said cathode and said grid, an indicating instrument in the anode circuit, each of the high-frequency-oscillation circuits including a damping resistance of at least one thousand ohms in parallel to the inductance element and the capacity element of said circuit, the inductive elements of said oscillation circuits consisting of simple wire coils, the capacity element having a capacity of about 4000 cm. for the resistance measuring circuit and a capacity of about 800 cm. for the capacity measuring circuit, the damping resistance being of about three thousand ohms for the resistance measuring circuit and of about five thousand ohms for the capacity measuring circuit, and the coupling between the anode and the grid circuit being inductive and having a coefficient of about 90%.

4. In apparatus for measuring electrical resistances and capacities, a thermionic valve having a cathode and an anode and a grid-electrode, a grid circuit and an anode circuit comprising means for generating high-frequency-oscillations consisting of two oscillation circuits each containing an inductance coil and a condenser, back coupling means between the anode and the grid circuit, a switch adapted to connect said valve to one of said oscillation circuits for the measuring of resistance and to the other circuit for the measuring of capacity, means for connecting the electrical constant to be measured between said cathode and said grid, an indicating instrument in the anode circuit, each of the high-frequency-oscillation circuits including a damping resistance of at least one thousand ohms disposed in parallel to the inductance and the capacity of said circuit, the condenser having a capacity of about 4000 cm. for the resistance measuring circuit and a capacity of about 800 cm. for the capacity measuring circuit, the damping resistance being of about three thousand ohms for the resistance measuring circuit and of about five thousand ohms for the capacity measuring circuit, the coupling between the anode and the grid circuit being inductive and having a coefficient of about 90%, and at least one of the back-coupled coil systems consisting of two single coils disposed in parallel.

5. In apparatus for measuring electrical resistances and capacities, a thermionic valve containing a cathode and an anode and a grid-electrode, a grid circuit and an anode circuit comprising means for generating high-frequency-oscillations consisting of two oscillation circuits each containing an inductance coil and a condenser, back coupling means between the anode and the grid circuit, a switch adapted to connect said valve to one of said oscillation circuits for the measuring of resistance and to the other circuit for the measuring of capacity, means for connecting the electrical constant to be measured between said cathode and said grid, a grid bias resistance of at least about one hundred ohms disposed in series between said electrical constant and said cathode, an indicating instrument in the anode circuit, each of the high-frequency-oscillation circuits including a damping resistance of at least one thousand ohms disposed in parallel to the inductance coil and the condenser of said circuit.

6. In apparatus for measuring electrical resistances and capacities, a thermionic valve containing a cathode and an anode, and a grid-electrode, a grid circuit and an anode circuit comprising means for generating high-frequency-oscillations consisting of two oscillation circuits each containing an inductance coil and a condenser, back coupling means between the anode and the grid circuit, a switch adapted to connect said valve to one of said oscillation circuits for the measuring of resistance and to the other circuit for the measuring of capacity, means for connecting the electrical constant to be measured between said cathode and said grid, a grid bias resistance of at least about one hundred ohms shunted by a condenser of about 2000 cm. disposed in series between said electrical constant and said cathode, an indicating instrument in the anode circuit, and each of the high-frequency-oscillation circuits including a damping resistance of at least one thousand ohms disposed in parallel to the inductance coil and the condenser of said circuit.

7. In apparatus for measuring electrical resistances and capacities, a thermionic valve containing a cathode and an anode and a grid-electrode, a grid circuit and an anode circuit comprising means for generating high-frequency-oscillations consisting of two oscillation circuits each containing an inductance coil and a condenser, back coupling means between the anode and the grid circuit, a switch adapted to connect said valve to one of said oscillation circuits for the measuring of resistance and to the other circuit for the measuring of capacity, means for connecting the electrical constant to be measured between said cathode and said grid, an indicating instrument in the anode circuit, one of the terminals of said instrument being connected over a resistance to the positive side of a potential source and to the anode of the valve, the other terminal being connected over a resistance to the positive potential and over a resistance to the oscillation circuit, and each of the high-frequency-oscillation circuits including a damping resistance of at least one thousand ohms being disposed in parallel to the inductance coil and the condenser of said circuit.

8. In apparatus for measuring electrical resistances and capacities, a thermionic valve containing a cathode and an anode and a grid-electrode, a grid circuit and an anode circuit comprising means for generating high-frequency-oscillations consisting of two oscillation circuits each containing an inductance coil and a condenser, back coupling means between the anode and the grid circuit, a switch adapted to connect said valve to one of said oscillation circuits for the measuring of resistance and to the other circuit for the measuring of capacity, means for connecting the electrical constant to be measured between said cathode and said grid, an indicating instrument in the anode circuit, one of the terminals of said instrument being connected over a resistance to the positive side of a potential source and to the anode of the valve, the other terminal being connected over a resistance to the positive potential and over a resistance to the oscillation circuit, switches provided for disconnecting said oscillation circuit for the purpose of measuring potentials, said resistances connected to the terminals of said instrument then forming three members of a Wheatstone bridge the fourth member of which is formed by said thermionic valve and one of the diagonals of which being formed by the instrument and the other diagonal by the anode potential source.

REINHOLD ROSENBERGER.